United States Patent
Cojocaru et al.

(10) Patent No.: US 10,661,960 B2
(45) Date of Patent: *May 26, 2020

(54) BLISTER PACKAGES

(71) Applicant: SOLVAY SPECIALTY POLYMERS ITALY S.P.A., Bollate (IT)

(72) Inventors: Paula Cojocaru, Legnano (IT); Francesco Maria Triulzi, Garbagnate Milanese (IT); Marco Apostolo, Senago (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 295 days.

This patent is subject to a terminal disclaimer.

(21) Appl. No.: 15/106,906

(22) PCT Filed: Dec. 23, 2014

(86) PCT No.: PCT/EP2014/079124
§ 371 (c)(1),
(2) Date: Jun. 21, 2016

(87) PCT Pub. No.: WO2015/097208
PCT Pub. Date: Jul. 2, 2015

(65) Prior Publication Data
US 2017/0001781 A1    Jan. 5, 2017

(30) Foreign Application Priority Data
Dec. 23, 2013  (EP) ..................... 13199367

(51) Int. Cl.
| | |
|---|---|
| B65D 75/36 | (2006.01) |
| A61J 1/03 | (2006.01) |
| C23C 18/16 | (2006.01) |
| B32B 27/08 | (2006.01) |
| B32B 27/30 | (2006.01) |
| B32B 27/32 | (2006.01) |
| B32B 3/30 | (2006.01) |
| B65D 65/38 | (2006.01) |
| C23C 18/22 | (2006.01) |
| C23C 18/48 | (2006.01) |
| C23C 28/04 | (2006.01) |
| C25D 5/54 | (2006.01) |
| B32B 38/00 | (2006.01) |

(52) U.S. Cl.
CPC ............ *B65D 75/367* (2013.01); *A61J 1/035* (2013.01); *B32B 3/30* (2013.01); *B32B 27/08* (2013.01); *B32B 27/304* (2013.01); *B32B 27/322* (2013.01); *B65D 65/38* (2013.01); *C23C 18/1641* (2013.01); *C23C 18/1653* (2013.01); *C23C 18/22* (2013.01); *C23C 18/48* (2013.01); *C23C 28/04* (2013.01); *C25D 5/54* (2013.01); *B32B 2038/0092* (2013.01); *B32B 2307/412* (2013.01); *B32B 2307/7244* (2013.01); *B32B 2307/7265* (2013.01); *B32B 2439/00* (2013.01); *B32B 2439/70* (2013.01); *B32B 2439/80* (2013.01)

(58) Field of Classification Search
None
See application file for complete search history.

(56) References Cited

U.S. PATENT DOCUMENTS

| | | |
|---|---|---|
| 4,424,256 A | 1/1984 | Christensen et al. |
| 5,250,349 A | 10/1993 | Nakagawa et al. |
| 5,336,370 A * | 8/1994 | Chipalkatti ............. C23C 18/22 216/52 |
| 6,270,869 B1 | 8/2001 | Zeiter et al. |
| 6,334,926 B1 | 1/2002 | Kang et al. |
| 2006/0029955 A1 * | 2/2006 | Guia ................ G01N 33/48728 435/6.11 |
| 2007/0224346 A1 * | 9/2007 | Wojtaszek .................. C08J 7/12 427/229 |
| 2008/0153938 A1 * | 6/2008 | Grobe ....................... C08F 2/52 522/99 |
| 2008/0251411 A1 | 10/2008 | Walker et al. |

(Continued)

FOREIGN PATENT DOCUMENTS

| | | |
|---|---|---|
| EP | 414636 A1 | 2/1991 |
| JP | 2009-262935 A | 11/2009 |
| JP | 2013-503760 A | 2/2013 |

OTHER PUBLICATIONS

Alger Mark S.M., "Polymer Science Dictionary", 1989, London School of Polymer Technology, Polytechnic of North London, UK published by Elsevier Applied Science, p. 476.

*Primary Examiner* — Shamim Ahmed

(57) ABSTRACT

The present invention pertains to a process for packaging one or more products, said process comprising the following steps: (i) providing a package having an opening, said package comprising at least one sheet, said sheet comprising the following layers: a layer [layer (L1)] consisting of a composition [composition (C1)] comprising, preferably consisting of, at least one thermoplastic polymer [polymer (T1)], said layer (L1) having two opposite surfaces, wherein one surface comprises one or more grafted functional groups [surface (L1-S1-f)], directly adhered to the surface (L1-S1-f), a layer [layer (L2)] consisting of at least one metal compound [compound (M1)], and optionally, directly adhered to the layer (L2), a layer (L3) consisting of a composition [composition (C3)] comprising, preferably consisting of at least one thermoplastic polymer [polymer (T2)], said polymer (T2) being equal to or different from the polymer (T1); (ii) feeding the package provided in step (i) with one or more products; and (iii) sealing the package provided in step (ii). The present invention also pertains to said package, to a process for the manufacture of said package and to uses of said package in various applications.

9 Claims, No Drawings

(56) References Cited

U.S. PATENT DOCUMENTS

2009/0004461 A1\* 1/2009 Geddes .................. B05D 7/02
  428/327
2011/0049003 A1 3/2011 Bellamah et al.
2011/0210037 A1 9/2011 Muenster et al.

\* cited by examiner

BLISTER PACKAGES

This application is a U.S. national stage entry under 35 U.S.C. § 371 of International Application No. PCT/EP2014/079124 filed Dec. 23, 2014, which claims priority to European application No. 13199367.7 filed on Dec. 23, 2013. The entire contents of these applications are explicitly incorporated herein by this reference.

TECHNICAL FIELD

The present invention pertains to a package, to a process for its manufacture and to its uses in various applications.

BACKGROUND ART

A package is known in the art as being a container in the form of a flexible bag or rigid walled housing provided with an opening that serves to provide access to the interior of the container. A lid or cover sheet is positioned over the opening and bonded to the container, typically by heat sealing, to enclose and seal the container interior and its contents from the external environment.

Blister packages suitable for the packaging and storing of food and drink, medicaments and other products have to comply with specific requirements in terms of barrier properties against moisture and gases, in particular oxygen, to firstly prevent ingress of moisture and gases through the packaging walls into the packaged products and secondly from the inside of the packaging into the surroundings.

By way of example, a wide variety of medicaments require to be stored into packages typically exhibiting water vapour permeability values below 0.06 g/(m$^2$×24 h), preferably below 0.04 g/(m$^2$×24 h).

Blister packages usually comprise two sheets which are firmly bonded to each other: a first base sheet containing cavities matched to the products to be packed, which is obtained typically by thermoforming a flat, preferably optically transparent, thermoplastic polymer film, and a second lid sheet, which, after the products have been properly fed to the preformed base sheet, is sealed onto the base sheet typically by heat sealing.

The base sheet commonly accounts for 80-85% by weight of the total weight of the blister package and the lid sheet commonly makes up the remaining 15-20% by weight of the total weight of said blister package.

Blister packages are commonly referred to as push-through packages if the packaged products can be pushed through the lid sheet by pressure on the base sheet and removed individually from the blister package.

Otherwise, blister packages are commonly referred to as peel-push packages if the lid sheet can be at least partially peeled off before removal of the packaged products by pushing against the base sheet.

The base sheet is usually optically transparent but it can be obscured for use in child-resistant packages or to protect light-sensitive drugs.

Several thermoplastic polymer films are commonly used for this purpose. Polyvinylidene chloride (PVDC) and polychlorotrifluoroethylene (PCTFE) polymers are particularly suitable for use in the manufacture of optically transparent base sheets for blister packages due to their low permeability to moisture and/or gases, in particular oxygen.

For instance, U.S. Pat. No. 4,424,256 (AMERICAN CAN COMPANY) Jan. 3, 1984 discloses a heat sealable flexible packaging film comprising a heat sealable layer (12) made from a linear low density polyethylene, an adhesive layer (14) made from a blend of 20% to 80% of a linear low density polyethylene and 80% to 20% of a propylene ethylene copolymer, a layer (16) made from an anhydride-modified propylene-based primer and a layer (18) made from an aluminium foil. An additional layer (20) of a protective polymeric material may be present on the surface of the layer (18) opposite to the layer (12). The sheet may be readily made into a pouch, said pouch being suitable for packaging products which will be subjected to a sterilizing process after the product is put into the package and the package is sealed.

Also, U.S. Pat. No. 6,270,869 (ALUSUISSE TECHNOLOGY MANAGEMENT LTD.) Aug. 7, 2001 discloses a laminate film for a push-through or a blister pack, said laminate film comprising, in succession, a plastic layer made from any of a polyvinylchloride, a polyester, a polypropylene, a polyamide or a cyclo-olefin copolymer, a metal foil and an oriented polyamide film having a thickness of from 25 µm to 32 µm. The metal foil may be pre-treated with a primer on one or both its sides.

Further, U.S. Pat. No. 5,250,349 (MITSUI PETROCHEMICAL INDUSTRIES, LTD.) Oct. 5, 1993 discloses a laminate for a package, said laminate comprising a thermoplastic resin layer which is adhered to a metal layer through an adhesive resin composition comprising, inter alia, 1 to 15 parts by weight of a polyethylene graft-modified with an unsaturated carboxylic acid or a derivative thereof.

However, optically transparent base sheets having water vapour permeability values below 0.06 g/(m$^2$×24 h) are commonly achievable by using PCTFE films having a thickness greater than 100 µm.

On the other side, aluminium films are typically used as lid sheets which advantageously have water vapour permeability values below 0.04 g/(m$^2$×24 h).

However, aluminium films are not optically transparent and have low deformability, and cannot therefore be used to produce relatively small blister packages.

It is also desirable that the lid sheet of a peel-push blister package maintains its integrity during the opening of the package and during the full lifetime of use of the blister package such as during any coiling or winding up of the lid sheet once separated from the base sheet.

To override the drawbacks of the blister packages of the prior art, lid sheets have been developed in the form of laminates with plastic films comprising, inter alia, aluminium layers. See, for instance, US 2011/0210037 (J. MUENSTER ET AL.) Sep. 1, 2011 and US 2008/0251411 (GLAXOSMITHKLINE CORPORATE) Oct. 16, 2008.

There is nevertheless still the need in the art for thermoplastic polymer material-based film assemblies providing for packages having high barrier properties from the external environment, low thickness, good optical transparency and good sealability, while maintaining good interlayer adhesion properties, and for a cost-effective and environmentally friendly process for the manufacture of said packages allowing the lowest possible consumption of raw materials.

SUMMARY OF INVENTION

It has been now surprisingly found that the package of the present invention has advantageously a thickness as low as to provide for outstanding flexibility properties while ensuring high barrier properties from the external environment and, preferably, good optical transparency over the long term.

In particular, it has been found that the package of the invention is endowed with low permeability to water vapour and gases, in particular to oxygen.

Also, it has been found that the package of the invention exhibits good interlayer adhesion properties.

Further, it has been found that the package of the invention can be easily obtained by the process of the invention.

In a first instance, the present invention pertains to a process for manufacturing a package, said process comprising the following steps:
(1) providing at least one sheet comprising a layer [layer (L1)] consisting of a composition [composition (C1)] comprising, preferably consisting of, at least one thermoplastic polymer [polymer (T1)], said layer (L1) having two opposite surfaces;
(2) treating one surface of the layer (L1) with a radio-frequency glow discharge process in the presence of an etching gas medium;
(3) applying by electroless deposition a layer [layer (L2)] onto the surface of the layer (L1) provided in step (2), said layer (L2) being consisting of at least one metal compound [compound (M1)]; and
(4) optionally, directly adhering to the layer (L2) a layer [layer (L3)] consisting of a composition [composition (C3)] comprising, preferably consisting of, at least one thermoplastic polymer [polymer (T2)], said polymer (T2) being equal to or different from the polymer (T1).

In a second instance, the present invention pertains to a package obtainable by the process of the invention, said package comprising at least one sheet, said sheet comprising the following layers:
a layer [layer (L1)] consisting of a composition [composition (C1)] comprising, preferably consisting of, at least one thermoplastic polymer [polymer (T1)], said layer (L1) having two opposite surfaces, wherein one surface comprises one or more grafted functional groups, [surface (L1-S1-f)],
directly adhered to the surface (L1-S1-f), a layer [layer (L2)] consisting of at least one metal compound [compound (M1)], and
optionally, directly adhered to the layer (L2), a layer (L3) consisting of a composition [composition (C3)] comprising, preferably consisting of, at least one thermoplastic polymer [polymer (T2)], said polymer (T2) being equal to or different from the polymer (T1).

In a third instance, the present invention pertains to a process for packaging one or more products, said process comprising the following steps:
(i) shaping the at least one sheet of the package as defined above thereby providing a package having an opening;
(ii) feeding the package provided in step (i) with one or more products; and
(iii) sealing the package provided in step (ii).

For the purpose of the present invention, the term "package" is intended to denote a container in the form either of a flexible bag or of a rigid walled housing.

The package of the invention is typically an assembly comprising at least two sheets as defined above, said sheets being adhered to each other.

For the purpose of the present invention, the term "sheet" is intended to denote a flat multilayer film.

For the purpose of the present invention, by the term "layer" it is meant a covering piece of material or a part that lies over or under another having a thickness smaller than either of its length or its width.

For the purpose of the present invention, the term "product" is intended to denote a product which matches the shape of the package. Products suitable for use in the package of the invention may be either in solid or in liquid state.

In a fourth instance, the present invention pertains to use of the package of the invention in various applications such as pharmaceutical and food applications.

Thus, the present invention pertains to use of the package of the invention as a pharmaceutical package comprising one or more pharmaceutical products.

Non-limiting examples of pharmaceutical products include, notably, tablets and capsules.

The present invention also pertains to use of the package of the invention as a food package comprising one or more food products.

The package of the invention may further comprise, directly adhered to the layer (L2), a layer [layer (L4)] consisting of at least one metal compound [compound (M2)], said compound (M2) being equal to or different from the compound (M1).

The layer (L4) of the package of the invention, if any, is preferably obtainable by electro-deposition onto the layer (L2).

The package of the invention is preferably a blister package comprising:
(A) a base sheet comprising one or more blisters, said base sheet comprising a layer [layer (L1)] consisting of a composition [composition (C1)] comprising, preferably consisting of, at least one thermoplastic polymer [polymer (T1)], said layer (L1) having two opposite surfaces, and
(B) directly adhered to said base sheet, a lid sheet, said lid sheet comprising the following layers:
a layer [layer (L1)] consisting of a composition [composition (C1)] comprising, preferably consisting of, at least one thermoplastic polymer [polymer (T1)], said layer (L1) having two opposite surfaces, wherein one surface comprises one or more grafted functional groups [surface (L1-S1-f)],
directly adhered to the surface (L1-S1-f), a layer [layer (L2)] consisting of at least one metal compound [compound (M1)], and
optionally, directly adhered to the layer (L2), a layer (L3) consisting of a composition [composition (C3)] comprising, preferably consisting of, at least one thermoplastic polymer [polymer (T2)], said polymer (T2) being equal to or different from the polymer (T1).

The blister package of the invention is advantageously obtainable by a process comprising the following steps:
(1') providing a base sheet comprising a layer [layer (L1)] consisting of a composition [composition (C1)] comprising, preferably consisting of, at least one thermoplastic polymer [polymer (T1)], said layer (L1) having two opposite surfaces;
(2') thermoforming the base sheet provided in step (1') thereby providing a base sheet comprising one or more blisters;
(3') feeding one or more blisters of the base sheet provided in step (2') with one or more products;
(4') providing a lid sheet comprising a layer [layer (L1)] consisting of a composition [composition (C1)] comprising, preferably consisting of, at least one thermoplastic polymer [polymer (T1)], said layer (L1) having two opposite surfaces;
(5') treating one surface of the layer (L1) with a radio-frequency glow discharge process in the presence of an etching gas medium;

(6') applying by electroless deposition a layer [layer (L2)] onto the surface of the layer (L1) provided in step (5'), said layer (L2) consisting of at least one metal compound [compound (M1)]; and (7') sealing, optionally through one or more adhesive layers, the layer (L1) of the lid sheet provided in step (6') onto the layer (L1) of the base sheet provided in step (3').

The blister package of the invention typically comprises a base sheet (A) comprising one or more blisters, said base sheet (A) comprising the following layers:

a layer [layer (L1)] consisting of a composition [composition (C1)] comprising, preferably consisting of, at least one thermoplastic polymer [polymer (T1)], said layer (L1) having two opposite surfaces, wherein one surface comprises one or more grafted functional groups [surface (L1-S1-f)], directly adhered to the surface (L1-S1-f), a layer [layer (L2)] consisting of at least one metal compound [compound (M1)], and optionally, directly adhered to the layer (L2), a layer (L3) consisting of a composition [composition (C3)] comprising, preferably consisting of, at least one thermoplastic polymer [polymer (T2)], said polymer (T2) being equal to or different from the polymer (T1).

According to an embodiment of the package of the invention, the surface (L1-S1-f) of the layer (L1) is advantageously obtainable by treating one surface of the layer (L1) with a radio-frequency glow discharge process in the presence of an etching gas medium.

The term "functional group" is used herein according to its usual meaning to denote a group of atoms linked to each other by covalent bonds which is responsible for the reactivity of the surface (L1-S1-f) of the polymer (T1).

For the purpose of the present invention, the term "grafted functional groups" is intended to denote functional groups obtainable by grafting onto to the main chain of the polymer (T1).

For the purpose of the present invention, the term "grafting" is used according to its usual meaning to denote a radical process by which one or more functional groups are inserted onto the surface of a polymer backbone.

The grafted functional groups obtainable by treating one surface of the layer (L1) with a radio-frequency glow discharge process in the presence of an etching gas medium typically comprise at least one atom of said etching gas medium.

According to a preferred variant of this embodiment of the package of the invention, the layer (L2) is advantageously obtainable by electroless deposition onto the surface (L1-S1-f) of the layer (L1).

The blister package of the invention may further comprise, directly adhered to the layer (L2), a layer [layer (L4)] consisting of at least one metal compound [compound (M2)], said compound (M2) being equal to or different from the compound (M1).

The layer (L4) of the blister package of the invention, if any, is preferably obtainable by electro-deposition onto the layer (L2).

The layer (L1) of the sheet of the package of the invention is usually the inner layer of said package.

The layer (L1) of the base sheet (A) and the layer (L1) of the lid sheet (B) of the blister package of the invention, equal to or different from each other, are typically the inner layers of the blister package of the invention.

The lid sheet (B) of the blister package of the invention is advantageously mechanically peelable from the base sheet (A) of said blister package.

For the purpose of the present invention, the term "blister" is intended to denote a pocket within the base sheet (A) of the blister package. The pockets may define any suitable profile including those with a square, circular or rectangular profile or rounded-corner variations of the square and rectangular profiled.

According to certain embodiments of the inventions, two or more blisters within the base sheet (A) of the blister package of the invention may be linked to each other.

The blister package of the invention is typically in the form of a blister package strip wherein one or more blisters are arranged in linear series arrangement or zig-zag arrangement or circular arrangement along the length of the base sheet (A).

The sheet of the package of the invention is preferably optically transparent.

The base sheet (A) and the lid sheet (B) of the blister package of the invention are preferably optically transparent thereby providing an optically transparent blister package.

For the purpose of the present invention, by the term "optically transparent" it is meant that the sheet allows incident electromagnetic radiation to pass there through without being scattered.

The sheet of the package of the invention is advantageously optically transparent to incident electromagnetic radiation having a wavelength of from about 100 nm to about 2500 nm, preferably of from about 400 nm to about 800 nm.

The sheet of the package of the invention is preferably not optically transparent to incident electromagnetic radiation having a wavelength of from about 100 nm to about 400 nm.

The sheet of the package of the invention has advantageously a transmittance of at least 50%, preferably of at least 55%, more preferably of at least 60% of the incident electromagnetic radiation.

The transmittance can be measured using a spectrophotometer according to any suitable techniques.

For the purpose of the present invention, the term "thermoplastic polymer" is intended to denote whichever polymer existing, at room temperature, below its glass transition temperature, if it is amorphous, or below its melting point, if it is semi-crystalline, and which is linear or branched (i.e. not reticulated). The thermoplastic polymer has the property of becoming soft when it is heated and of becoming rigid again when it is cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

The thickness of the layer (L1) is not particularly limited; it is nevertheless understood that layer (L1) will have typically a thickness of at least 5 µm, preferably of at least 10 µm. Layers (L1) having thickness of less than 5 µm, while still suitable for the insulation system of the invention, will not be used when adequate mechanical resistance is required.

As per the upper limit of the thickness of the layer (L1), this is not particularly limited, provided that said layer (L1) still can provide the flexibility required for the particular field of use targeted.

The skilled in the art, depending on the nature of the polymer (T1), will select the proper thickness of the layer (L1) so as to provide for the permeability and flexibility properties required.

Also, the skilled in the art, depending on the nature of the polymer (T1), will select the proper thickness of the layer (L1) so as to provide for the optical transparency required.

Also, the thickness of the layer (L3), if any, is not particularly limited; it is nevertheless understood that layer (L3) will have typically a thickness of at least 5 µm, preferably of at least 10 µm. Layers (L3) having thickness of less than 5 µm, while still suitable for the package of the invention, will not be used when adequate mechanical resistance is required.

As per the upper limit of the thickness of the layer (L3), if any, this is not particularly limited, provided that said layer (L3) still can provide the flexibility required for the particular field of use targeted.

The skilled in the art, depending on the nature of the polymer (T2), will select the proper thickness of the layer (L3) so as to provide for the permeability and flexibility properties required.

Also, the skilled in the art, depending on the nature of the polymer (T2), will select the proper thickness of the layer (L3) so as to provide for the optical transparency required.

The layer (L1) and the layer (L3), if any, equal to or different from each other, are preferably optically transparent.

The polymer (T1) and the polymer (T2), equal to or different from each other, are preferably selected from the group consisting of:
  vinyl chloride-based polymers selected from the group consisting of polyvinyl chloride, copolymers of vinyl chloride with one or more other comonomers and mixtures thereof [(PVC) polymers],
  vinylidene chloride-based polymers selected from the group consisting of polyvinylidene chloride, copolymers of vinylidene chloride with one or more other comonomers such as 1,1-dichloroethane and mixtures thereof [(PVDC) polymers],
  chlorotrifluoroethylene-based polymers selected from the group consisting of polychlorotrifluoroethylene, copolymers of chlorotrifluoroethylene with one or more other comonomers and mixtures thereof [(PCTFE) polymers],
  polyolefins such as low-density, linear low-density and high-density polyethylene, polypropylene and biaxially oriented polypropylene, and polybutylene,
  copolymers of ethylene such as ethylene-vinyl acetate, ethylene-vinyl alcohol and ethylene-acrylic acid,
  substituted polyolefins such as polystyrene and poly(vinyl alcohol),
  polyesters such as polyethylene terephthalate, polybutylene terephthalate, polyethylene naphthalate and copolymers thereof,
  polycarbonates,
  polyamides such as polyamide 6, polyamide 6.6 and polyamide 6.10,
  polyacrylonitriles,
  cellulose, and
  polylactic acid.

The (PCTFE) polymer preferably comprises recurring units derived from chlorotrifluoroethylene (CTFE), from at least one hydrogenated monomer selected from ethylene, propylene and isobutylene and, optionally, one or more additional monomers, typically in amounts of from 0.01% to 30% by moles, based on the total amount of CTFE and said hydrogenated monomer(s).

The (PCTFE) polymer more preferably comprises:
(a) from 50% to 70% by moles of chlorotrifluoroethylene (CTFE);
(b) from 30% to 50% by moles of ethylene (E); and
(c) optionally, up to 5% by moles, preferably up to 2.5% by moles, based on the total amount of monomers (a) and (b), of one or more fluorinated monomers and/or hydrogenated monomers.

The composition (C1) may further comprise one or more additives such as, but not limited to, pigments. The skilled in the art, depending on the thickness of the layer (L1), will select the proper amount of one or more additives in the composition (C1).

The composition (C1) is typically processed in molten phase using melt-processing techniques. The composition (C1) is usually processed by extrusion through a die at temperatures generally comprised between 100° C. and 300° C. to yield strands which are usually cut for providing pellets. Twin screw extruders are preferred devices for accomplishing melt compounding of the composition (C1).

The layer (L1) is typically manufactured by processing the pellets so obtained through traditional film extrusion techniques. Film extrusion is preferably accomplished using a flat cast film extrusion process or a hot blown film extrusion process.

Under step (2') of the process of the invention, the base sheet provided in step (1') is thermoformed thereby providing a base sheet (A) comprising one or more blisters typically by feeding said base sheet from a roll or from an extruder into a set of indexing chains that incorporate pins, or spikes, that pierce the base sheet and transport it through an oven for heating to forming temperature.

The skilled in the art, depending on the nature of the base sheet, will select the proper temperature for its thermoforming processing.

The composition (C3) is typically processed in molten phase using melt-processing techniques. The composition (C3) is usually processed by extrusion through a die at temperatures generally comprised between 100° C. and 300° C. to yield strands which are usually cut for providing pellets. Twin screw extruders are preferred devices for accomplishing melt compounding of the composition (C3).

The layer (L3) is typically manufactured by processing the pellets so obtained through traditional film extrusion techniques. Film extrusion is preferably accomplished using a flat cast film extrusion process or a hot blown film extrusion process.

The layer (L1) is preferably further processed by one or more planarization techniques.

Non-limiting examples of suitable planarization techniques include, notably, bistretching, polishing and planarization coating treatments.

It has been found that by further processing the layer (L1) by one or more planarization techniques its surface is rendered smooth so as to ensure higher interlayer adhesion with the layer (L2).

By "radio-frequency glow discharge process" it is hereby intended to denote a process powered by a radio-frequency amplifier wherein a glow discharge is generated by applying a voltage between two electrodes in a cell containing an etching gas. The glow discharge so generated then typically passes through a jet head to arrive to the surface of the material to be treated.

By "etching gas medium" it is hereby intended to denote either a gas or a mixture of gases suitable for use in a radio-frequency glow discharge process.

The etching gas medium is preferably selected from the group consisting of air, $N_2$, $NH_3$, $CH_4$, $CO_2$, He, $O_2$, $H_2$ and mixtures thereof.

The etching gas medium more preferably comprises $N_2$ and/or $NH_3$ and, optionally, $H_2$.

The radio-frequency glow discharge process is typically carried out under reduced pressure or under atmospheric pressure.

The radio-frequency glow discharge process is preferably carried out under atmospheric pressure at about 760 Torr.

Atmospheric-pressure plasmas have prominent technical significance because, in contrast with low-pressure plasma or high-pressure plasma, no reaction vessel is needed to ensure the maintenance of a pressure level differing from atmospheric pressure.

The radio-frequency glow discharge process is typically carried out at a radio-frequency comprised between 1 kHz and 100 kHz.

The radio-frequency glow discharge process is typically carried out at a voltage comprised between 1 kV and 50 kV.

According to a first embodiment of the process of the invention, the radio-frequency glow discharge process generates a corona discharge.

The radio-frequency glow discharge process of this first embodiment of the process of the invention is typically carried out at a radio-frequency comprised between 5 kHz and 15 kHz.

The radio-frequency glow discharge process of this first embodiment of the process of the invention is typically carried out at a voltage comprised between 1 kV and 20 kV.

The corona discharge typically has a density comprised between $1\times10^9$ and $1\times10^{13}$ cm$^{-3}$.

According to a second embodiment of the process of the invention, the radio-frequency glow discharge process generates a plasma discharge.

The radio-frequency glow discharge process of this second embodiment of the process of the invention is typically carried out at a radio-frequency comprised between 10 kHz and 100 kHz.

The radio-frequency glow discharge process of this second embodiment of the process of the invention is typically carried out at a voltage comprised between 5 kV and 15 kV.

The plasma discharge typically has a density comprised between $1\times10^{16}$ and $1\times10^{19}$ cm$^{-3}$.

The Applicant has found that, after treatment of one surface of the layer (L1) with a radio-frequency glow discharge process in the presence of an etching gas medium, the layer (L1) successfully maintains its bulk properties including its flexibility properties and its optical transparency.

Non-limiting examples of grafted functional groups of the surface (L1-S1-f) of the layer (L1), obtainable by treatment of the surface of the layer (L1) with a radio-frequency glow discharge process in the presence of an etching gas medium comprising $N_2$ and/or $NH_3$ and, optionally, $H_2$, typically under atmospheric pressure, include, notably, those selected from the group consisting of amine groups (—$NH_2$), imine groups (—CH=NH), nitrile groups (—CN) and amide groups (—$CONH_2$).

The nature of the grafted functional groups of the surface (L1-S1-f) of the layer (L1) can be determined by any suitable techniques, typically by FT-IR techniques such as Attenuated Total Reflectance (ATR) coupled to FT-IR techniques or by X-ray induced photoelectron spectroscopy (XPS) techniques.

The Applicant has surprisingly found that the surface (L1-S1-f) of the layer (L1) advantageously provides for outstanding interlayer adhesion with a layer (L2) applied thereto by electroless deposition.

The compound (M1) and the compound (M2), equal to or different from each other, are typically selected from the group consisting of:

(a) Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof, and (b) metal oxides selected from the group consisting of:
SiOx, ZnO, $In_2O_3$, $SnO_2$ and mixtures thereof, wherein x is comprised between 0.5 and 2,
impurity-doped metal oxides selected from the group consisting of ZnO, $In_2O_3$, $SnO_2$, CdO and mixtures thereof such as Sn-doped metal oxides selected from the group consisting of ZnO, $In_2O_3$, $SnO_2$, CdO and mixtures thereof and Al-doped metal oxides selected from the group consisting of ZnO, $In_2O_3$, $SnO_2$, CdO and mixtures thereof, and
$Zn_2SnO_4$, $ZnSnO_3$, $Zn_2In_2O_5$, $Zn_3In_2O_6$, $In_2SnO_4$, $CdSnO_3$ and mixtures thereof.

For the purpose of the present invention, by "electroless deposition" it is meant a redox process, typically carried out in a plating bath, wherein a metal compound is reduced from its oxidation state to its elemental state in the presence of suitable chemical reducing agents.

The surface (L1-S1-f) of the layer (L1) is typically contacted with an electroless metallization catalyst thereby providing a catalytic layer [layer (L1$_c$)].

The layer (L2) is then typically obtainable by electroless deposition onto the layer (L1$_c$) using a composition (C2) comprising at least one metal ion deriving from at least one compound (M1).

The Applicant thinks, without this limiting the scope of the invention, that the layer (L1$_c$) is a transient intermediate of the electroless deposition process so that the layer (L2) is finally directly adhered to the surface (L1-S1-f) of the layer (L1).

The electroless metallization catalyst is typically selected from the group consisting of catalysts based on palladium, platinum, rhodium, iridium, nickel, copper, silver and gold.

The electroless metallization catalyst is preferably selected from palladium catalysts such as $PdCl_2$.

The surface (L1-S1-f) of the layer (L1) is typically contacted with the electroless metallization catalyst in liquid phase in the presence of at least one liquid medium.

The composition (C2) typically comprises at least one metal ion deriving from at least one compound (M1), at least one reducing agent, at least one liquid medium and, optionally, one or more additives.

Non-limiting examples of suitable liquid media include, notably, water, organic solvents and ionic liquids.

Among organic solvents, alcohols are preferred such as ethanol.

Non-limiting examples of suitable reducing agents include, notably, formaldehyde, sodium hypophosphite and hydrazine.

Non-limiting examples of suitable additives include, notably, salts, buffers and other materials suitable for enhancing stability of the catalyst in the liquid composition.

Should the compound (M1) be selected from metal oxides (b) as defined above, the layer (L2) is advantageously optically transparent.

The layer (L2) has typically a thickness comprised between 0.05 µm and 5 µm, preferably between 0.5 µm and 1.5 µm.

The thickness of the layer (L2) can be measured by any suitable techniques, typically by scanning electron microscopy (SEM) techniques.

The layer (L2) of the blister package of the invention is preferably consisting of a compound (M1) selected from the group consisting of:
(a') Cu, Al, Ni, Pd, Ag, Au and alloys thereof, and
(b') metal oxides selected from the group consisting of:
  SiOx, ZnO, $In_2O_3$, $SnO_2$ and mixtures thereof, wherein x is comprised between 0.5 and 2,
  impurity-doped metal oxides selected from the group consisting of ZnO, $In_2O_3$, $SnO_2$, CdO and mixtures thereof such as Sn-doped metal oxides selected from the group consisting of ZnO, $In_2O_3$, $SnO_2$, CdO and mixtures thereof and Al-doped metal oxides selected from the group consisting of ZnO, $In_2O_3$, $SnO_2$, CdO and mixtures thereof, and
  $Zn_2SnO_4$, $ZnSnO_3$, $Zn_2In_2O_5$, $Zn_3In_2O_6$, $In_2SnO_4$, $CdSnO_3$ and mixtures thereof.

The package thereby provided is then typically dried, preferably at a temperature comprised between 50° C. and 150° C., more preferably at a temperature comprised between 100° C. and 150° C.

The layer (L4) is typically applied onto the layer (L2) by electro-deposition using a composition (C4) comprising at least one metal ion deriving from at least one compound (M2).

For the purpose of the present invention, by "electro-deposition" it is meant a process, typically carried out in an electrolytic cell, using an electrolytic solution, wherein an electric current is used to reduce a metal compound from its oxidation state to its elemental state.

The composition (C4) preferably comprises at least one metal ion deriving from at least one compound (M2), at least one metal halide and, optionally, at least one ionic liquid.

Non-limiting examples of suitable ionic liquids include, notably, those comprising:
  a cation selected from the group consisting of a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms, and
  an anion selected from the group consisting of halide anions, perfluorinated anions and borates.

The Applicant has also found that the layer (L2) advantageously provides for outstanding interlayer adhesion with a layer (L4) applied thereto by electro-deposition.

Should the compound (M2) be selected from metal oxides (b) as defined above, the layer (L4) is advantageously optically transparent.

The layer (L4), if any, has typically a thickness comprised between 0.05 μm and 5 μm, preferably between 0.5 μm and 1.5 μm.

The thickness of the layer (L4) can be measured by any suitable techniques, typically by scanning electron microscopy (SEM) techniques.

The package thereby provided is then typically dried, preferably at a temperature comprised between 50° C. and 150° C., more preferably at a temperature comprised between 100° C. and 150° C.

Sealing is carried out at a temperature typically comprised between 150° C. and 300° C. by any techniques commonly known in the art.

Among conventional techniques, mention can be notably made of melt-processing techniques such as colaminating, coextrusion, for example coextrusion-laminating, coextrusion-blow moulding and coextrusion-moulding, extrusion-coating, coating, overinjection-moulding or coinjection-moulding techniques.

Sealing is typically carried out through one or more adhesive layers.

The adhesive layer typically consists of at least one polymer selected from the group consisting of:
  polyolefins such as polyethylene and polypropylene,
  copolymers of ethylene such as ethylene-vinyl acetate, ethylene-vinyl alcohol and ethylene-acrylic acid, and
  silane-grafted polyolefins.

It is understood that the layer (L1) of the base sheet (A) and the layer (L1) of the lid sheet (B) of the blister package of the invention are sealed onto each other except in the region of the blisters.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials
ECTFE (50:50 molar ratio)

EXAMPLE 1—MANUFACTURE OF A FLUOROPOLYMER LAYER

For manufacturing thin films, pellets of ECTFE were processed in a cast extrusion film line equipped with a 2.5" single stage extruder. Extruder is connected to the die via an adapter equipped with breaker plate. The die was a 1370 mm wide auto-gauge die. Upon exit from the die, molten tape was casted on three subsequent chill rolls, whose speed was adapted so as to obtain a film. Total thickness and thickness variation along the width are controlled by a Beta-ray gauge control system with retrofit to the die. The final width of the film, after edge cutting, was about 1050 mm.

The following processing conditions were used for a 50 μm thick film (see Tables 1 and 2 here below):

TABLE 1

| Zone | Temperature [° C.] |
| --- | --- |
| Main Barrel Zone 1 | 275 |
| Main Barrel Zone 2 | 280 |
| Main Barrel Zone 3 | 280 |
| Main Barrel Zone 4 | 280 |
| Clamp | 280 |
| Adapter 1 | 280 |
| Adapter 2 | 280 |

TABLE 2

| Zone | Temperature [° C.] |
| --- | --- |
| Adapter | 280 |
| Die Zone 1 | 285 |
| Die Zone 2 | 285 |
| Die Zone 3 | 285 |
| Die Zone 4 | 285 |
| Die Zone 5 | 285 |
| Top Roll | 90 |
| Centre Roll | 170 |
| Bottom Roll | 170 |

EXAMPLE 2—SURFACE MODIFICATION OF A FLUOROPOLYMER LAYER

The fluoropolymer film so obtained was treated by a radio-frequency plasma discharge process. The etching gas used was $N_2$. Working radio-frequency and voltage had values of 40 kHz and 20 kV, respectively.

EXAMPLE 3—METALLIZATION PROCESS OF A FLUOROPOLYMER LAYER

The fluoropolymer film treated by plasma as detailed hereinabove was coated with metallic copper by electroless plating. Prior to the copper deposition, the fluoropolymer layer was catalyzed by the wet process of Pd activation. This activation process was carried out by the immersion of the fluoropolymer layer in an aqueous solution containing 0.03 g/L of $PdCl_2$ for 1 min, resulting in the substrate being entirely covered with Pd particles at a high density.

The activated fluoropolymer film was then immersed in an aqueous plating bath containing 6 g/L of $CuSO_4$, 27 g/l of EDTA disodium salt hydrate, formaldehyde 7.4 ml/l and 5.6 g/l of sodium hydroxide. The plating temperature was 60° C. and its pH value was 10.

COMPARATIVE EXAMPLE 1—METALLIZATION PROCESS OF A FLUOROPOLYMER LAYER §

A fluoropolymer film was prepared following the same procedure as detailed above under Example 3, but without surface modification by plasma of the fluoropolymer film.

COMPARATIVE EXAMPLE 2—METALLIZATION PROCESS OF A FLUOROPOLYMER LAYER

The fluoropolymer film treated by plasma as detailed in Example 2 was coated with metallic nickel by sputtering according to usual techniques.

Evaluation of Adhesion of the Metallized Fluoropolymer Assembly

Adhesion of the metallic layer on the fluoropolymer substrates has been characterized by means of ASTM D3359 cross cut test standard procedure. Using a cutting tool, two series of perpendicular cuts were applied on the metallic layer in order to create a lattice pattern on it. A piece of tape was then applied and smoothened over the lattice and removed with an angle of 180° with respect to the metallic layer. The adhesion of metallic layer on the fluoropolymer was then assessed by comparing the lattice of cuts with the ASTM D3359 standard procedure. The classification of test results ranged from 5B to 0B, whose descriptions are depicted in Table 3.

TABLE 3

| ASTM D3359 Classification | Description |
|---|---|
| 5B | The edges of the cuts are Completely smooth; none of the squares of the lattice is detached. |
| 4B | Detachment of flakes of the coating at the intersections of the cuts. A cross cut area not significantly greater than 5% is affected. |
| 3B | The coating has flaked along the edges and/or at the intersection of the cuts. A cross cut area significantly greater than 5%, but not significantly greater than 15% is affected. |
| 2B | The coating has flaked along the edges of the cuts partly or wholly in large ribbons, and/or it has flaked partly of wholly on different parts of the squares. A cross cut area significantly greater than 15%, but not significantly greater than 65%, is affected. |
| 1B | The coating has flaked along the edges of the cuts in large ribbons and/or some squares have detached partly or wholly. A cross cut area significantly greater than 35%, but not significantly greater than 65%, is affected. |
| 0B | Any degree of flaking that cannot be classified even by classification 1B. |

The adhesion values for metallized fluoropolymer assemblies obtained according to Example 1 and comparative Examples 1 and 2 are set forth in Table 4 here below.

TABLE 4

| Run | Adhesion strength ASTM D3359 |
|---|---|
| Example 3 | 5B |
| C. Example 1 | 0B |
| C. Example 2 | 1B |

It has been thus found that the multilayer assembly according to the present invention advantageously provided for outstanding interlayer adhesion properties as compared to multilayer assemblies according to Comparative Examples 1 and 2. No interlayer adhesion was observed for the multilayer assembly obtained according to Comparative Example 1, wherein the surface of the fluoropolymer film was not modified by plasma treatment.

Evaluation of Surface Functionalization by XPS after Plasma Treatment

The fluoropolymer film obtained according to Example 1 as described above was provided as such. It has been found by XPS analysis that the surface modified fluoropolymer layer obtained according to Example 2 comprises functional groups containing nitrogen atoms (2.87 At %) as compared to the bare fluoropolymer film obtained according to Example 1, wherein its surface, as confirmed by XPS analysis, does not comprise functional groups containing nitrogen atoms.

Evaluation of Water Vapour Permeation Properties of the Metallized Fluoropolymer Assembly The fluoropolymer film obtained according to Example 1 as described above was provided as such.

Water vapour permeability was measured according to ASTM F1249 standard test procedure by means of the Water Vapor Transmission Rate (WVTR).

It has been found that the metallized fluoropolymer layer of the invention as notably obtained according to Example 3 advantageously provided for lower water vapour permeability as compared to the bare fluoropolymer film obtained according to Example 1 (see Table 5 below).

TABLE 5

| Run | WVTR [g/m2day] |
|---|---|
| Ex. 1 | 26 |
| Ex. 3 | 0.7 |

Deposition of 0.2 μm of copper, resulting in a total thickness of the multilayer assembly of 50.2 μm, was advantageously sufficient to highly reduce water vapour permeation with respect to the bare fluoropolymer film having a thickness of 50 μm obtained according to Example 1.

In view of the above, it has been found that the multilayer assembly according to the present invention is particularly suitable for use in packaging applications.

The invention claimed is:

1. A process for manufacturing a package, said process comprising:
    treating one surface of a layer (L1) with a radio-frequency glow discharge process in the presence of an etching gas medium, wherein layer (L1) is part of a sheet, wherein layer (L1) consists of a composition (C1) comprising at least one thermoplastic polymer (T1), and wherein layer (L1) has two opposite surfaces;
    applying by electroless deposition a layer (L2) onto the surface of the layer (L1), said layer (L2) consisting of at least one metal compound (M1);
    optionally, directly adhering to layer (L2), a layer (L3) consisting of a composition (C3) comprising at least one thermoplastic polymer (T2), said polymer (T2) being equal to or different from polymer (T1); and
    shaping the sheet, thereby providing a package having an opening.

2. The process according to claim 1, wherein polymer (T1) and polymer (T2), equal to or different from each other, are selected from the group consisting of:
    vinyl chloride-based polymers selected from the group consisting of polyvinyl chloride, copolymers of vinyl chloride with one or more other comonomers and mixtures thereof,
    vinylidene chloride-based polymers selected from the group consisting of polyvinylidene chloride, copolymers of vinylidene chloride with one or more other comonomers such as 1,1-dichloroethane and mixtures thereof,
    chlorotrifluoroethylene-based polymers selected from the group consisting of polychlorotrifluoroethylene, copolymers of chlorotrifluoroethylene with one or more other comonomers and mixtures thereof,
    polyolefins,
    copolymers of ethylene,
    substituted polyolefins,
    polyesters,
    polycarbonates,
    polyamides,
    polyacrylonitriles,
    cellulose, and
    polylactic acid.

3. The process according to claim 1, wherein the radio-frequency glow discharge process is carried out at a radio-frequency between 1 kHz and 100 kHz.

4. The process according to claim 1, wherein the radio-frequency glow discharge process is carried out at a voltage between 1 kV and 50 kV.

5. The process according to claim 1, wherein the etching gas medium is selected from the group consisting of air, $N_2$, $NH_3$, $CH_4$, $CO_2$, He, $O_2$, $H_2$ and mixtures thereof.

6. The process according to claim 5, wherein the etching gas medium comprises $N_2$ and/or $NH_3$ and, optionally, $H_2$.

7. The process according to claim 1, said process further comprising applying by electro-deposition a layer (L4) consisting of at least one metal compound (M2) onto layer (L2), said compound (M2) being equal to or different from compound (M1).

8. The process according to claim 1, wherein composition (C1) consists of at least one thermoplastic polymer (T1).

9. The process according to claim 1, wherein composition (C3) consists of at least one thermoplastic polymer (T2).

* * * * *